United States Patent
Schmidt et al.

(10) Patent No.: US 12,403,816 B2
(45) Date of Patent: Sep. 2, 2025

(54) METHOD FOR OPERATING A MOTOR VEHICLE, AND MOTOR VEHICLE

(71) Applicant: AUDI AG, Ingolstadt (DE)

(72) Inventors: Valentin Schmidt, Neuburg a.d. Donau (DE); Tilman Armbruster, Ingolstadt (DE); Johannes Reim, Ingolstadt (DE); Marcel Debelec, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 274 days.

(21) Appl. No.: 18/042,055

(22) PCT Filed: Aug. 17, 2021

(86) PCT No.: PCT/EP2021/072797
§ 371 (c)(1),
(2) Date: Feb. 17, 2023

(87) PCT Pub. No.: WO2022/038117
PCT Pub. Date: Feb. 24, 2022

(65) Prior Publication Data
US 2023/0365052 A1 Nov. 16, 2023

(30) Foreign Application Priority Data
Aug. 18, 2020 (DE) .............. 10 2020 121 671.8

(51) Int. Cl.
*B60Q 1/14* (2006.01)
(52) U.S. Cl.
CPC ...... *B60Q 1/1423* (2013.01); *B60Q 2300/112* (2013.01); *B60Q 2300/122* (2013.01); *B60Q 2300/314* (2013.01)
(58) Field of Classification Search
None
See application file for complete search history.

(56) References Cited

U.S. PATENT DOCUMENTS

| | | | | |
|---|---|---|---|---|
| 1,381,391 A | * | 6/1921 | Benjamin | ............... B60Q 1/14 362/284 |
| 1,646,860 A | * | 10/1927 | Heidt | ................. B60Q 1/1415 315/318 |

(Continued)

FOREIGN PATENT DOCUMENTS

| | | |
|---|---|---|
| DE | 3704029 A1 | 8/1988 |
| DE | 10306108 A1 | 9/2004 |

(Continued)

OTHER PUBLICATIONS

International Search Report and Written Opinion of the International Searching Authority directed to related International Patent Application No. PCT/EP2021/072797, mailed Nov. 10, 2021, with attached English-language translation; 20 pages.

(Continued)

*Primary Examiner* — Srinivas Sathiraju
(74) *Attorney, Agent, or Firm* — Sterne, Kessler, Goldstein &Fox P.L.L.C.

(57) ABSTRACT

A method for operating a motor vehicle, wherein the motor vehicle has a lighting device comprising at least two headlight devices, wherein the headlight devices is arranged horizontally offset on a front side of the motor vehicle and each having one or more dimmable lamps, wherein a spatial region extending in front of the motor vehicle over a horizontal angular range can be illuminated by each headlight device according to a respective brightness generated by the lamp or lamps, wherein, before or during a reverse travel of the motor vehicle, as a function of a steering angle of the motor vehicle, the brightnesses of the lamp or lamps of at least one of the headlight devices are adjusted,— wherein, when using headlight devices comprising multiple lamps, the lamps are adjusted such that at least one portion of the spatial region-opposite the direction of the turning of the steering wheel is illuminated at an increased brightness, (Continued)

and/or—wherein, when using headlight devices comprising at least one lamp, the brightness of the at least one lamp of a headlight device in the direction of the steering angle is dimmed.

14 Claims, 3 Drawing Sheets

(56) References Cited

U.S. PATENT DOCUMENTS

| | | | | |
|---|---|---|---|---|
| 1,673,318 | A * | 6/1928 | Deming | B60Q 1/1438 |
| | | | | 362/233 |
| 2,062,323 | A * | 12/1936 | Lochman | B60Q 1/34 |
| | | | | 362/330 |
| 5,754,100 | A | 5/1998 | Park | |
| 5,770,999 | A * | 6/1998 | Rhodes | B60R 16/0315 |
| | | | | 340/471 |
| 6,390,637 | B1 * | 5/2002 | Vollkommer | G02B 6/0071 |
| | | | | 362/614 |
| 6,499,864 | B2 * | 12/2002 | Luce | F21S 41/675 |
| | | | | 362/280 |
| 7,052,163 | B2 * | 5/2006 | George | B60Q 3/30 |
| | | | | 362/490 |
| 8,395,321 | B2 * | 3/2013 | Tanaka | H05B 41/2885 |
| | | | | 315/80 |
| 9,989,203 | B2 * | 6/2018 | Hoehmann | F21V 9/08 |
| 11,726,184 | B2 * | 8/2023 | Ferreira | G01S 17/894 |
| | | | | 356/4.01 |
| 2001/0040807 | A1 * | 11/2001 | Luce | F21S 41/365 |
| | | | | 362/346 |
| 2003/0039124 | A1 | 2/2003 | Tawa et al. | |
| 2005/0152144 | A1 * | 7/2005 | Nash | F21V 17/12 |
| | | | | 362/276 |
| 2006/0023461 | A1 * | 2/2006 | Knight | F21S 41/143 |
| | | | | 362/466 |
| 2009/0267517 | A1 * | 10/2009 | Tanaka | H05B 41/2885 |
| | | | | 315/82 |
| 2014/0043483 | A1 * | 2/2014 | Schuder | H04N 7/18 |
| | | | | 348/148 |
| 2015/0078025 | A1 * | 3/2015 | Kleiner | F21S 43/251 |
| | | | | 362/511 |
| 2015/0167907 | A1 * | 6/2015 | Hoehmann | F21V 3/08 |
| | | | | 362/84 |
| 2015/0167913 | A1 * | 6/2015 | Stefanov | F21S 41/663 |
| | | | | 362/511 |
| 2017/0205033 | A1 * | 7/2017 | Hoehmann | G02B 26/008 |
| 2020/0284883 | A1 * | 9/2020 | Ferreira | G01S 7/4815 |
| 2023/0365052 | A1 * | 11/2023 | Schmidt | B60Q 1/12 |

FOREIGN PATENT DOCUMENTS

| | | | | |
|---|---|---|---|---|
| DE | 10313731 | A1 | 10/2004 | |
| DE | 102004055882 | A1 | 6/2006 | |
| DE | 102006039182 | A1 | 3/2008 | |
| DE | 102015015052 | A1 | 5/2016 | |
| DE | 102015005568 | A1 | 11/2016 | |
| DE | 102017207298 | A1 | 11/2018 | |
| EP | 1488955 | A2 | 12/2004 | |
| GB | 2464019 | A * | 4/2010 | B60Q 1/1423 |
| WO | WO-2022260603 | A1 * | 12/2022 | F21S 41/645 |

OTHER PUBLICATIONS

International Preliminary Report on Patentability directed to related International Patent Application No. PCT/EP2021/072797, completed Nov. 15, 2022, with attached English-language translation; 12 pages.

* cited by examiner

METHOD FOR OPERATING A MOTOR VEHICLE, AND MOTOR VEHICLE

TECHNICAL FIELD

The present disclosure relates to a method for operating a motor vehicle, wherein the motor vehicle has a lighting device comprising at least two headlight devices, wherein the headlight devices are arranged horizontally offset on a front side of the motor vehicle and each have one or more dimmable lamps, wherein a spatial region extending in front of the motor vehicle over a horizontal angular range can be illuminated by each headlight device as a function of a respective brightness generated by the lamp or lamps. In addition, the present disclosure relates to a motor vehicle.

BACKGROUND

Upon the reverse travel of a motor vehicle, situations may arise in which obstacles in front of the vehicle must be observed. This can be the case, for example, when a motor vehicle is moved in reverse out of a parking space, wherein a steering movement is performed during the reverse travel. Thereby, objects arranged next to the motor vehicle before or during a reverse travel may come into the range of motion of the front of the vehicle, such that it is desirable to be able to detect them even in poor visibility conditions, for example in the dark, in order to avoid an unintentional collision with such objects. Various methods are known from the prior art for this purpose.

DE 10 2015 015 052 A1 describes a method for operating a motor vehicle with which a cornering light is emitted in the opposite direction to a steering direction upon the reverse travel of the motor vehicle.

From DE 103 06 108 A1, a motor vehicle is known which comprises at least one right-side and at least one left-side cornering headlight, which are arranged in the front and/or side region of the motor vehicle. When the motor vehicle moves forward in a parking situation, at least the right-side cornering headlight is switched on if a turning of the steering wheel causing the steering angle to the left has occurred and vice versa.

DE 37 04 029 A1 describes a motor vehicle with permanently installed bend lighting arranged on the right and left of a front side of the motor vehicle. From a certain turning of the steering wheel, different contacts are closed depending on the direction of the turning of the steering wheel, such that either the right or the left cornering headlight is switched on. As a result, when driving around a curve in reverse travel, the area of the surrounding area is illuminated towards which the front part of the motor vehicle swivels.

DE 103 13 731 A1 discloses a headlight device for a motor vehicle with at least a low beam function, a high beam function and a cornering light function. Thereby, a parking light is switched on from the low beam and/or the cornering light upon a reverse travel and a turning of the steering wheel to illuminate an area to the side in front of the motor vehicle.

BRIEF DESCRIPTION OF DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

In the drawings, like reference numbers generally indicate identical or similar elements. Additionally, generally, the left-most digit(s) of a reference number identifies the drawing in which the reference number first appears.

DETAILED DESCRIPTION

Figure 1:
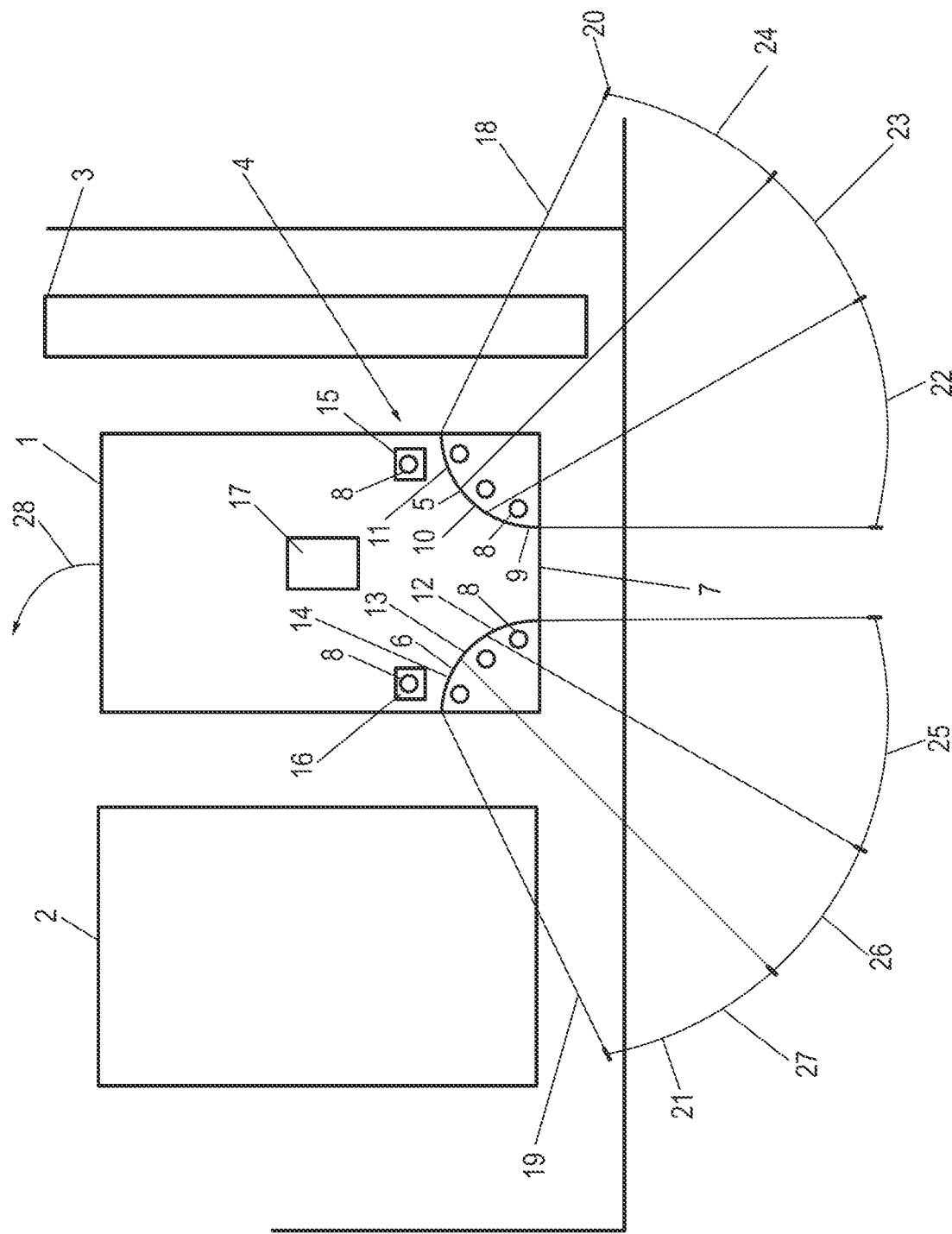
FIG. 1 shows an exemplary embodiment of a motor vehicle in a first situation for describing a method, according to an embodiment.

The present disclosure is based on the task of specifying an improved method for operating a motor vehicle, which in particular improves the operation of a lighting device comprising at least two headlight devices upon reverse travel of the vehicle.

To achieve this task, a method of the type mentioned at the beginning of the present disclosure provides for the brightness of the lamp or lamps of at least one of the headlight devices to be adjusted before or during a reverse travel of the motor vehicle as a function of a turning of the steering wheel of the motor vehicle, wherein, when using headlight devices comprising multiple lamps, the lamps are adjusted such that at least one portion of the spatial region opposite the direction of the turning of the steering wheel is illuminated at an increased brightness, and/or wherein, when using headlight devices comprising at least one lamp, the brightness of the at least one lamp of a headlight device arranged in the direction of the turning of the steering wheel is dimmed.

The method according to an embodiment is used to adjust the lamps of at least two headlight devices of the motor vehicle. The motor vehicle comprises at least two headlight devices with multiple dimmable lamps, which are arranged horizontally offset relative to one another on a front side of the motor vehicle and/or two headlight devices with at least one dimmable lamp each, which are likewise arranged horizontally offset relative to one another on a front side of the motor vehicle. Each of the headlight devices illuminates a spatial region in front of the vehicle assigned to the respective headlight device, wherein each of the spatial regions extends over a horizontal angular range.

The method according to an embodiment has the advantage that, by illuminating at an increased brightness a portion opposite the direction of the turning of the steering wheel of a spatial region in front of the vehicle illuminated by a headlight device comprising multiple lamps, better detectability of objects located there is achieved. This detectability of objects can additionally or alternatively also be improved by dimming the brightness of a headlight device comprising at least one lamp, which is arranged in the direction of the turning of the steering wheel. Upon a turning of the steering wheel to the left, a right-side portion of the illuminable spatial region of at least one of the headlight devices can therefore be illuminated by multiple lamps at an increased brightness.

In addition or alternatively, a lamp of a headlight device comprising at least one lamp, which is arranged on the left side of the motor vehicle, can be dimmed, i.e., operated at a reduced brightness. Dimming the lamp in this connection means that the brightness of the lamp is reduced, but the lamp is not switched off, i.e., that a reduction of the brightness of the lamp to a value greater than zero is performed. Accordingly, upon reverse travel and a turning of the steering wheel to the right, a left-side portion of at least one of the headlight devices can be illuminated by multiple lamps at an increased brightness. In addition or alternatively, a lamp of a headlight device comprising at least one lamp, which is arranged on the right side of the motor vehicle, can be dimmed.

In particular, the at least two headlight devices with multiple lamps can each illuminate a portion opposite the direction of the turning of the steering wheel. In the case of the headlight devices comprising at least one lamp, the headlight device arranged opposite the direction of the turning of the steering wheel can be operated in particular with maximum brightness.

Changing the brightness in the portion or portions of the headlight devices comprising multiple lamps and/or dimming the lamp of the headlight device comprising at least one lamp takes place in particular in the case of headlight devices that are already in operation and/or are intended for such operation upon a reverse travel without a turning of the steering wheel. Thereby, the headlight devices comprising multiple lamps may be operated with a normal brightness distribution, with which, in particular, a central portion of the spatial region is illuminated at an increased brightness and peripheral portions of the spatial region are each illuminated at a reduced brightness.

In addition or alternatively, the headlight devices comprising at least one lamp may each be operated with a maximum brightness and/or with a brightness dimmed compared to a maximum brightness upon reverse travel without a turning of the steering wheel. It is also possible for the headlight devices, which comprise at least one lamp, to be switched off in each case upon reverse travel without a turning of the steering wheel.

In the case of a headlight device comprising multiple lamps, different brightnesses of the multiple lamps can be used to produce a different brightness distribution in the spatial region illuminated by the headlight device, which extends over a horizontal angular range in front of the motor vehicle. The brightness distribution in this spatial region, i.e., the brightness distribution over the horizontal angular range in which the spatial region extends, can be generated by different brightnesses of the lamps, which in particular are each assigned to a portion of the horizontal angular range or the spatial region.

By increasing or dimming the brightness of the lamps or by switching off one or more lamps, the brightness distribution over the horizontal angular range in the spatial region can be changed. This enables the brightness of the lamp or lamps to be adjusted upon a reverse travel and in the presence of a turning the steering wheel such that at least the portion of the spatial region opposite the direction of the turning of the steering wheel is illuminated at an increased brightness. This can be done, for example, by switching on the lamps of the headlight device assigned to the portion of the spatial region opposite the turning the steering wheel and/or operating them with a higher brightness than in normal operation for travel without a turning of the steering wheel.

The illumination of the spatial region by a headlight device comprising multiple lamps with a brightness distribution extending over the horizontal angular range of the spatial region can be understood as the illumination of the spatial region according to a dimming characteristic, wherein the dimming characteristic describes the brightness curve or the brightnesses generated and, if necessary, dimmed by the lamps assigned in each case to a subsection of the angular range and illuminating the respective subsections.

A headlight device comprising at least one lamp, which is arranged in the direction of the turning of the steering wheel, can be operated at a reduced brightness to improve the visibility of objects opposite the direction of the turning of the steering wheel. The brightness of the at least one lamp can be dimmed, in particular, such that the spatial region covered by the headlight device is also at least partially illuminated in the direction of the turning of the steering wheel.

By dimming, i.e., reducing the brightness, of the at least one lamp of the headlight device comprising at least one lamp, the electrical energy requirement of the lighting device can be advantageously reduced, which has an advantageous effect, for example in motor vehicles with an electric traction drive, on the range of the electric driving mode that is still available.

The fact that the motor vehicle is about to reverse or is in the process of reversing can be determined, for example, by the fact that a reverse gear of the motor vehicle is engaged and/or that a motor vehicle speed that causes the motor vehicle to reverse is present. The presence of a turning the steering wheel of the motor vehicle can be determined, for example, by using a steering angle sensor of the motor vehicle that determines a steering angle of the turning the steering wheel and/or by determining a steering wheel position and/or a wheel position or the like. For this purpose, a control unit designed to carry out the method according to an embodiment can be connected to a transmission and/or a speed sensor and/or to a steering angle sensor, a sensor for determining the steering wheel position and/or the wheel position and/or further sensors. In addition or alternatively, the control unit can also be connected to a steering control system, chassis electronics and/or drive electronics, which may likewise transmit information to the control unit about a reverse travel, the presence of a turning the steering wheel and/or a steering angle.

The lighting device of the motor vehicle can comprise multiple headlight devices, each having multiple lamps, wherein two of such headlight devices having multiple lamps are arranged horizontally offset on the front side of the motor vehicle. In addition or alternatively, the lighting device can also have two headlight devices comprising at least one lamp, which are also arranged offset on the front side of the motor vehicle. Dimmable lamps may be incandescent bulbs, which can be controlled, for example, by a current flowing through the bulb, or light-emitting diodes (LEDs), which can be controlled for dimming, for example, by pulse-width modulation.

According to the present disclosure, it can be provided that the brightnesses of the lamps of the at least one headlight device comprising multiple lamps are adjusted such that at least one portion of the spatial region lying in the direction of the turning of the steering wheel is illuminated at a reduced brightness. This can further contribute to the fact that a portion opposite the direction of the turning of the steering wheel, which is illuminated at an increased brightness, contributes to a better detectability of objects arranged in this portion. Reducing a portion lying in the direction of the turning of the steering wheel results in a shift, perceptible by a user of the motor vehicle, of a brightness distribution generated by the headlight device in the illuminable spatial region, in particular a shift of a brightness focus in the direction opposite the turning of the steering wheel.

In a preferred embodiment of the present disclosure, it can be provided that headlight devices designed to generate a turning light and/or to generate a low beam are used as the headlight devices comprising the multiple lamps. By using the headlight devices comprising multiple lamps to generate the turning light and/or to generate the low beam, it is possible to operate the turning light or the low beam in each case with a different brightness distribution over the horizontal angular range or with a different dimming characteristic, such that a brightness distribution can be generated by the headlight devices via the brightnesses of the individual lamps in the spatial regions that can be illuminated in each case by the headlight devices. A headlight device designed to generate a low beam and a headlight device designed to generate a turning light may each be arranged in separate housings. Alternatively, a headlight device designed to generate a low beam and a headlight device designed to generate a turning light may also be arranged in a common housing, in particular a common motor vehicle headlight.

According to the present disclosure, it can be provided that headlight devices with at least two segments are used, wherein at least one of the lamps of the headlight device is assigned to each segment of one of the headlight devices and each segment is designed to illuminate a portion of the spatial region. It is possible that more than one lamp is assigned to each horizontal angular range or that multiple segments are assigned to a subsection of the horizontal angular range in which illumination can be provided by the headlight device.

The lamps and/or the segments may, for example, be arranged in the form of a matrix of multiple rows, wherein the horizontal angular range is covered by one row of lamps in each case. The headlight devices comprising multiple lamps may be matrix headlights in particular. By using multiple rows of lamps, for example arranged one above the other, it is also possible to adjust a vertical brightness distribution in the spatial region by the brightness of the respective lamps assigned to the segments.

In principle, the number of segments or the number of lamps in the headlight devices is arbitrary; in particular, between 2 and 100 segments per headlight device may be used. For example, a headlight device used as a turning light and comprising multiple lamps can comprise between 2 and 10, in particular between 3 and 5, segments. A headlight device designed to generate a low beam with multiple lamps can comprise a larger number of lamps, for example between 10 and 25 lamps.

In a preferred embodiment of the present disclosure, it can be provided that the lamp or lamps of a headlight device designed to generate a low beam and the lamp or lamps of a headlight device designed to generate a turning light are controlled such that the respectively illuminated spatial regions adjoin or partially overlap one another, wherein an at least substantially continuous brightness distribution is generated over the resulting overall horizontal angular range.

In addition to the headlight device comprising multiple lamps and designed to generate a low beam, illumination of the portion of the spatial region that can be illuminated by the headlight device opposite the turning of the steering wheel can be improved by additionally controlling a headlight device comprising one or more lamps, which is designed to generate a turning light, such that the spatial region illuminated by the headlight device designed to generate the turning light is adjacent to the spatial region illuminated by the headlight device designed to generate the low beam. The spatial region that is illuminated by the headlight device designed to generate the turning light can, in particular, directly adjoin and/or partially overlap with the spatial region illuminated by the headlight device designed to generate the low beam. By generating an at least substantially continuous brightness distribution, an overall illumination of the total spatial region extending over the resulting total horizontal angular range, which is composed of the spatial regions respectively illuminated by the two headlight devices, that is perceived as pleasant is made possible.

According to an embodiment, it can be provided that the brightness with which the portion is illuminated is increased as a function of a steering angle of the turning of the steering wheel, in particular continuously or at intervals. Thereby, not only the direction of the turning of the steering wheel is taken into account, but also the degree of the turning of the steering wheel, i.e., with which steering angle it is turned, is taken into account, wherein the brightness with which the portion is illuminated is increased, in particular with a greater steering angle.

In a preferred embodiment of the present disclosure, it can be provided that the position of the portion relative to the horizontal angular range of the spatial region is changed as a function of a steering angle of the turning of the steering wheel, in particular continuously or at intervals. In this manner, in particular with a greater steering angle, a further shift of the portion can take place in the direction opposite the direction of the turning of the steering wheel, such that the more the turning of the steering wheel is increased or the greater the steering angle is, the further out the illumination is.

Thereby, the change can be made at intervals, wherein different positions of the portion are assigned to different steering angle intervals in particular. It is also possible to select intervals that are so small that a change in position of the portion that is perceived as continuous is achieved, i.e., upon an increase in the steering angle or a harder turn of the steering wheel, the portion that is illuminated at an increased brightness is shifted in the direction of the spatial region opposite the direction of the turning of the steering wheel. Accordingly, the portion with the increased brightness can also be moved back in the direction of the turning of the steering wheel as the steering angle decreases.

According to an embodiment, it can be provided that the brightness of the at least one lamp of a headlight device arranged in the direction of the turning of the steering wheel and designed to generate a turning light is dimmed. A further headlight device, if present, comprising at least one lamp, which is designed to generate a turning light and is arranged opposite the direction of the turning of the steering wheel, can be operated in particular without any change, i.e., with a brightness already present at the start of reverse travel.

In a preferred embodiment of the present disclosure, it can be provided that the brightness of the at least one lamp of the headlight device arranged in the direction of the turning of the steering wheel is dimmed as a function of a steering angle of the turning of the steering wheel, in particular continuously or at intervals. In particular, dimming can be increased as the steering angle turned becomes greater, such that the brightness with which the headlight device illuminates its assigned spatial region decreases as the steering angle turned becomes greater.

In a preferred embodiment of the present disclosure, it can be provided that the brightnesses of the lamp or lamps are adjusted or dimmed as a function of an ambient brightness.

If the ambient brightness is above a limit value for the ambient brightness, the headlight devices cannot be controlled. This can be the case in particular if it is so bright in the surrounding area that no headlight operation of the motor vehicle is necessary and/or headlight devices designed in particular to generate a low beam are not in operation due to the ambient brightness, i.e., all their lamps are switched off. In such a case, it is not necessary to provide for a shift in the dimming characteristic or a change in the brightness distribution in the spatial region illuminated by the headlight device upon a reverse travel.

In a preferred embodiment of the present disclosure, it can be provided that the brightnesses of the lamp or lamps are only adjusted or dimmed when at least one limit value for the steering angle of the turning of the steering wheel is exceeded. This makes it possible to avoid a situation in which, upon the reverse travel of the vehicle due to uneven ground or the like, the turning of the steering wheel varies slightly by a zero position, the lamps are already controlled and thus the brightness emitted by the headlight units into the spatial region is changed. For example, steering angles between 1° and 25°, in particular 5°, 10°, 15° or 20°, may be selected as the limit value for the steering angle. If there is a steering angle below the limit value for the steering angle, the headlight devices may be operated as before or at the start of reverse travel.

In a preferred embodiment of the present disclosure, it can be provided that, when the turning of the steering wheel is below the limit value, headlight devices comprising at least one lamp and designed to generate a turning light are operated at maximum brightness, dimmed or switched off. Whether the headlight devices designed to generate a turning light are each operated at maximum brightness, operated at a dimmed brightness, or switched off can be predefined or selected as a function of an ambient brightness, for example. The extent or strength of dimming of the lamp or lamp of the headlight or headlights designed to generate a turning light can also be determined as a function of an ambient brightness, for example.

According to an embodiment, it can be provided that the limit value for the steering angle is the same or different for a turning of the steering wheel to the left and for a turning of the steering wheel to the right. By selecting different limit values, the position of a driver in the motor vehicle can be taken into account, since the driver is located on the left or right side of the motor vehicle, depending on the design of the motor vehicle.

In a preferred embodiment of the present disclosure, it can be provided that the change in brightness or the dimming is reversed and/or at least one of the headlight devices is turned off if reverse travel is terminated and/or if a speed of the motor vehicle in the forward direction exceeds a speed threshold. The termination of a reverse travel can be determined analogously to the detection of a reverse travel as described above. For example, reverse travel can be assumed to have been terminated if a first gear, a drive position (D) or a neutral position (N) of a transmission is engaged or adjusted. Even if the motor vehicle is traveling at a speed in the forward direction, the change in brightness or the dimming can be reversed, in particular continuously or at intervals, or the one or more headlight devices can be switched off if the motor vehicle is traveling forward and/or the speed of the motor vehicle in the forward direction exceeds a speed threshold.

For a motor vehicle according to an embodiment, it is provided that it comprises a lighting device comprising at least two headlight devices and a control unit for controlling the lighting device, wherein the headlight devices is arranged horizontally offset on a front side of the motor vehicle and each having one or more dimmable lamps, wherein a spatial region extending in front of the motor vehicle over a horizontal angular range can be illuminated by each headlight device as a function of a respective brightness generated by the at least one lamp, wherein the control unit is designed to carry out a method according to the present disclosure.

The motor vehicle can be a motor vehicle driven by an internal combustion engine and/or an electric motor. In particular, the motor vehicle can have two headlight devices, each comprising multiple lamps, which are each designed to generate a low beam. In addition, the motor vehicle can have two headlight devices comprising at least one lamp, each of which is designed to generate a turning light. The control unit of the motor vehicle can be connected to a transmission and/or to a sensor for determining a steering wheel position and/or a wheel position and/or a steering angle sensor, wherein corresponding measured values are transmitted to the control unit in order to determine the presence of reverse travel, the presence and the direction of turning the steering wheel and/or a steering angle. In addition or alternatively, the control unit can be connected to a steering control system, chassis electronics and/or drive electronics of the motor vehicle, from which information on a reverse travel, the presence of a turning of a steering wheel, a steering angle of a turning of the steering wheel and/or further information may also be transmitted to the control unit.

Figure 2:
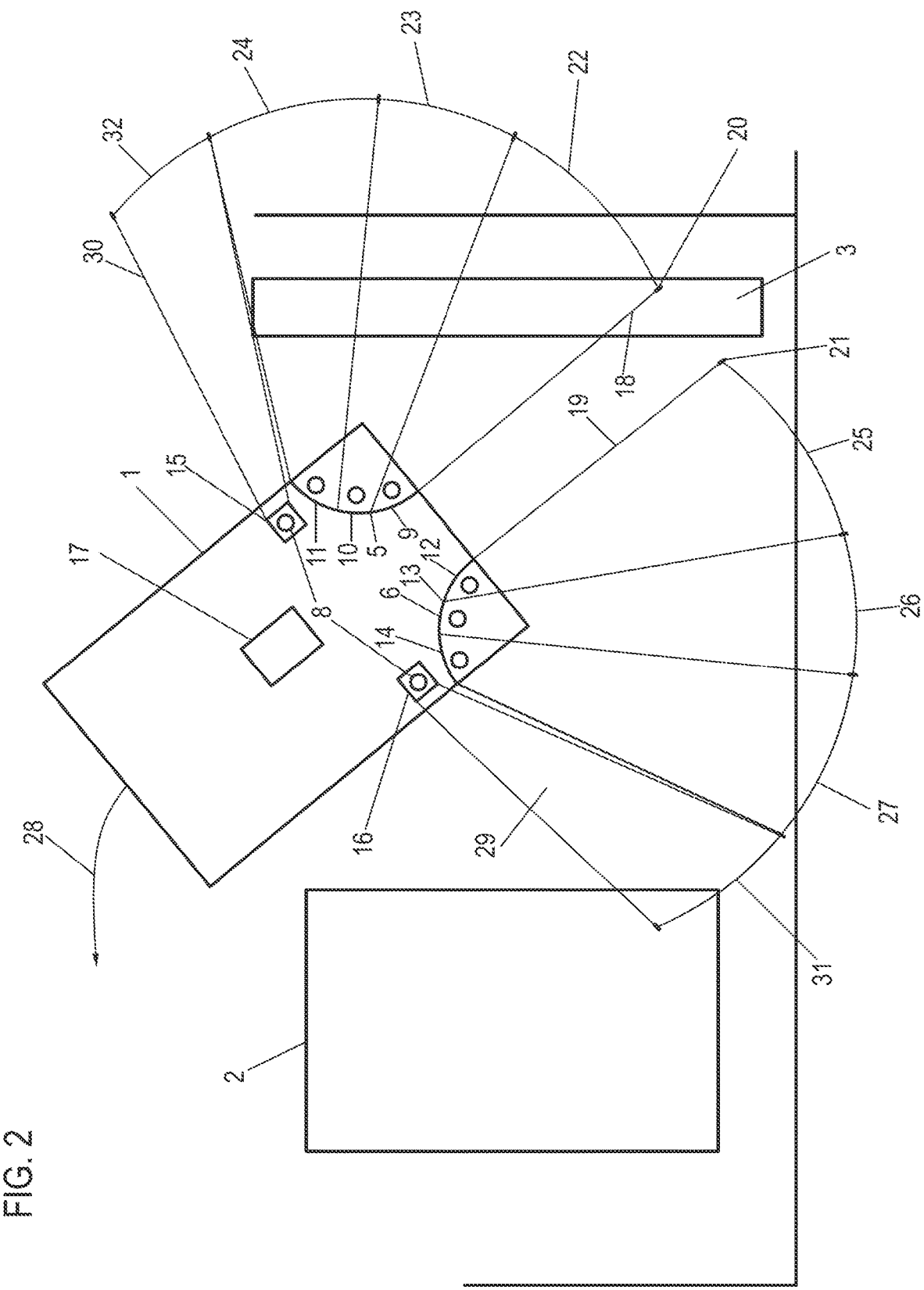
FIG. 2 shows an exemplary embodiment of the motor vehicle in a second situation for describing a method, according to an embodiment.
Figure 3:
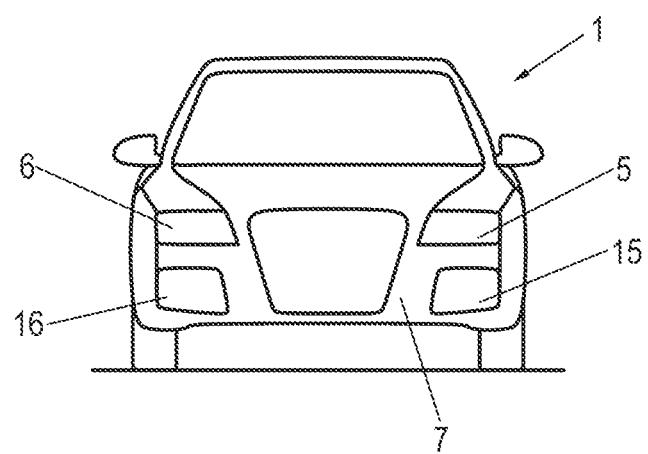
FIG. 3 shows a view of a front side of the motor vehicle, according to an embodiment.

Further advantages and details of the present disclosure arise from the exemplary embodiments described below and in reference to the drawings. These are schematic illustrations and show:

FIG. 1, an exemplary embodiment of a motor vehicle in a first situation for describing an exemplary embodiment of a method according to the present disclosure, FIG. 2, the exemplary embodiment of the motor vehicle in a second situation for describing an exemplary embodiment of a method according to the present disclosure, and FIG. 3, a view of a front side of the exemplary embodiment of the motor vehicle according to the present disclosure.

FIG. 1 shows a motor vehicle 1 according to the present disclosure, which is located in a parking space between another motor vehicle 2 and an obstacle 3, for example in the form of a wall. The motor vehicle 1 comprises a lighting device 4, which comprises two headlight devices 5, 6 arranged horizontally offset on a front side 7 of the motor vehicle 1. The headlight devices 5, 6 each comprise multiple dimmable lamps 8, each of which is assigned to different segments 9, 10, 11 of the headlight device 5 or different segments 12, 13, 14 of the headlight device 6. The lighting device 4 further comprises two headlight devices 15, 16, each having a dimmable lamp 8.

The headlight devices 5, 6, which each comprise multiple lamps 8, are designed to generate a low beam of the motor vehicle 1. The headlight devices 15, 16, which each comprise a lamp 8, are each designed to generate a turning light of the motor vehicle 1.

The motor vehicle 1 comprises a control unit 17, which is connected to the individual headlight devices 5, 6, 15, 16 (connections not shown here). The lighting device 4 of the motor vehicle 1 can be controlled by the control unit 17, wherein the brightnesses of the lamps 8 of the headlight devices 5, 6, 15, 16 may be adjusted by the control unit 17. The control unit 17 is further connected to a transmission of the motor vehicle 1 and/or to a sensor of the motor vehicle 1 for determining a steering wheel position and/or a wheel position and/or a steering angle sensor of the motor vehicle 1, wherein corresponding measured values and/or information about a currently engaged gear are transmitted to the control unit 17, in order to determine the presence of a reverse travel, the presence and direction of a turning of the steering wheel, and/or a steering angle. In addition or alternatively, the control unit 17 can be connected to a steering control system, chassis electronics and/or drive electronics of the motor vehicle 1, from which information may also be transmitted to the control unit 17 regarding a reverse travel, the presence of a turning of the steering wheel, a steering angle of a turning of the steering wheel and/or further information.

The headlight devices 5, 6 comprise multiple segments 9 to 14, wherein each of the segments is assigned one of the lamps 8 of the respective headlight device 5, 6. The illustration of three segments per headlight device is purely schematic; headlight devices 5, 6 with a larger number of segments 9 to 14 and thus also with a higher number of lamps 8 may also be used. In particular, between 2 and 100 segments may be used per headlight device 5, 6, 15, 16. For example, a headlight device 15, 16 used as a turning light and comprising multiple lamps can comprise between 2 and 10, in particular between 3 and 5, segments. A headlight device 5, 6 designed to generate a low beam with multiple lamps 8 can comprise a larger number of lamps 8, for example between 10 and 25 lamps 8.

A spatial region 18, 19 in front of the motor vehicle 1 can be illuminated by each of the headlight devices 5, 6. Thereby, the spatial region 18 extends over an angular range 20 and the spatial region 19 correspondingly over an angular range 21. As a function of the brightnesses generated by the lamps 8 of the headlight device 5, a brightness distribution or a dimming characteristic resulting over the angular range 20 of the spatial region 18 illuminated by the headlight device 5 can be adjusted by the various segments 9 to 11 of the headlight device 5.

By means of the lamps 8 of the headlight device 5, different portions 22, 23, 24 of the spatial region 18 illuminated by the headlight device 5 may be illuminated with different brightnesses. Accordingly, the brightnesses of the lamps 8 of the headlight device 6 may illuminate portions 25, 26, 27 of the spatial region 19 illuminated by the headlight device 6 with different brightnesses. The brightness of the lamps 8, which are designed as light-emitting diodes, for example, can be controlled by the control unit 17 by means of pulse-width modulation, wherein the control unit 17 of the motor vehicle 1 controls the lamps 8.

For the sake of clarity, the spatial regions 18, 19 of the headlight devices 5, 6 are not shown in an overlapping manner. However, in particular, in the case of headlight devices 5, 6 designed to generate a low beam, the spatial regions 18, 19 may overlap in front of the motor vehicle 1. A different alignment of the headlight devices 5, 6, in particular such that the centrally arranged portions 23 and 26 radiate directly forwards, is also possible in the case of headlight devices 5, 6 designed to produce a low beam. In the case of headlight devices 5, 6 designed to generate a low beam, it can be provided in particular that the spatial regions 18, 19 adjoin or partially overlap one another, such that the portions 23, 26 operated in each case with comparatively maximum brightness are directed substantially forwards in front of the motor vehicle 1 in normal operation.

As shown schematically by the arrow 28, the motor vehicle 1 is moved in a reverse travel for parking, wherein a turning of the steering wheel takes place to the right relative to the normal direction of travel of the motor vehicle. Before or during a reverse travel of the motor vehicle 1, the brightnesses of the lamps 8 of the headlight devices 5, 6, 15, 16 may be adjusted as a function of the turning of the steering wheel of the motor vehicle 1. Before the start of a reverse travel or before a reverse gear is engaged in the motor vehicle 1, the headlight devices 5, 6 are switched on, for example, and each generates a low beam. Thereby, the portion 23 of the illuminable spatial region 18 of the headlight device 5 is illuminated with the highest brightness and the portions 22 and 24 are each illuminated with a lower brightness. Accordingly, the portion 26 of the illuminable spatial region 19 of the headlight device 6 is illuminated with the highest brightness and the portions 25 and 27 are each illuminated with a lower brightness. In this manner, the headlight devices 5, 6 generate a brightness distribution or a dimming characteristic over the respective angular range 20 or 21. The headlight devices 15, 16 for generating the turning light are switched off before the start of a reverse travel or before a reverse gear is engaged in the motor vehicle 1, for example.

In FIG. 2, starting from FIG. 1, a situation is shown in which the motor vehicle 1 has already moved in reverse and is pulling out of the parking space between the other motor vehicle 2 and the obstacle 3 at an angle due to the steering angle turned to the right with respect to the normal direction of travel of the motor vehicle. In order to improve the visibility of the obstacle 3 during such reverse travel, the headlight devices 5, 6 comprising multiple lamps 8 are operated with a different brightness distribution in their respective spatial region 18, 19. For this purpose, the lamps 8 of the headlight device 5 are controlled such that a portion 24 of the spatial region 20 opposite the direction of the turning of the steering wheel is illuminated at an increased brightness.

For this purpose, for example, starting from the situation in FIG. 1, in which the portion 22 is illuminated with the highest brightness and portions 23 and 24 are illuminated at a reduced brightness, the brightness in the portion 24 can be increased, such that the portion 24 is illuminated at an increased brightness. Accordingly, the portion 25 of the headlight device 6 can also be illuminated at an increased brightness. In this manner, the brightness distribution in the spatial regions 18, 19 is changed such that the brightness distribution of the headlight device 5 is pivoted outward and the brightness distribution of the headlight device 6 is pivoted inward, in the direction of a center of the motor vehicle 1. In addition to increasing the brightness in portions 24 and 25, a reduction in brightness can be undertaken in portions 22 and 27, which are in the direction of the turning of the steering wheel, in order to improve the illumination of the obstacle 3 and/or other objects relevant to the reverse travel.

In addition or alternatively, the headlight device 16 comprising a lamp 8, which is arranged in the direction of the turning of the steering wheel of the motor vehicle 1, is dimmed, such that a spatial region 29 assigned with the headlight device 16, which extends over a horizontal angular range 31, is illuminated with a lower brightness. For this purpose, the brightness of the lamp 8 of the headlight device 16 can be reduced.

The lamp 8 of the headlight device 15 and the lamp 8 of the headlight device 5 are further controlled such that the spatial region 30 illuminated by the headlight device 15, which extends over a horizontal angular range 32, overlaps with or adjoins the spatial region 18 of the headlight device 5, such that, over a total spatial region extending the spatial region 18 of the headlight device 5 into the spatial region 30 of the headlight device 15, there is a continuous brightness distribution over the total encompassed horizontal total angular range of the spatial regions 18 and 30.

The brightnesses with which the portion 24 and the portion 25 are respectively illuminated are increased continuously or at intervals as a function of the turning of the steering wheel with which the motor vehicle 1 is moved in reverse. For this purpose, the control unit 17 is connected to a steering angle sensor (not shown here) of the motor vehicle 1, via which the steering angle of the motor vehicle 1 can be determined.

An increase in brightness in the portions 24, 25 opposite the direction of the turning of the steering wheel is undertaken if the steering angle exceeds a limit value. For example, steering angles between 1° and 25°, in particular 5°, 10°, 15° or 20°, may be selected as the limit value for the steering angle. Thereby, the limit value for the steering angle upon a turning of the steering wheel to the left can be the same as or different from a limit value for a steering angle upon a turning of the steering wheel to the right.

Upon a turning of the steering wheel below the limit value, the headlight devices 15, 16 designed to generate a turning light may be operated at maximum brightness, dimmed or switched off. Whether the headlight devices 15, 16 designed to generate a turning light are each operated at maximum brightness, operated at a dimmed brightness or switched off can be firmly predefined in the control unit 17 or selected, for example, by the control unit 17 as a function of an ambient brightness in the surrounding area of the motor vehicle 1. Moreover, the extent or strength of a dimming of the lamp or lamps 8 of the headlight devices 15, 16 can be determined, for example, as a function of an ambient brightness.

In the case of headlight devices 5, 6, which have more than three segments 9-14 in each case, a position of the portion illuminated at an increased brightness in each case can also be shifted as a function of the steering angle, such that, in the case of headlight device 5, the further outward, or in the case of headlight device 6, the further inward it is illuminated at an increased brightness, the harder the steering is turned or the greater the steering angle.

The dimming of the lamp 8 of the headlight device 16 designed to generate the turning light also takes place as a function of the steering angle, wherein the dimming, i.e., the extent to which the brightness is dimmed to a value greater than 0, is determined as a function of the steering angle. The greater the steering angle turned, the more it is dimmed, i.e., the more the brightness is reduced. In addition, the brightness of the lamp or lamps 8 can be changed or the lamp or lamps 8 can be dimmed as a function of the ambient brightness, such that, for example, the brightness is only changed or the brightness is only dimmed if the ambient brightness falls below a limit value, i.e., if the ambient brightness is such that it is necessary to illuminate the surrounding area of the motor vehicle 1. When the steering angle is reduced, for example at the end of the parking process, the change in position and/or the change in brightness may also be changed as a function of the steering angle such that the brightness distributions of the headlight devices 5, 6 approach the original state again, in particular continuously or at intervals.

It is also possible for the motor vehicle 1 to comprise headlight devices 15, 16, which have multiple lamps 8, via which multiple segments 9-14 and thus multiple portions of the spatial regions 29, 30 may likewise be illuminated in accordance with the explanations regarding the headlight devices 5, 6. Segmented turning lights of this type may be operated in accordance with that described in the explanations for the headlight devices 5, 6, wherein the spatial regions 29, 30 illuminated by the headlight devices 15, 16 designed to generate a turning light in each case radiate further to the side of the motor vehicle 1 compared with the spatial regions of headlight devices 5, 6 designed to generate a low beam. The headlight devices 15, 16 designed to generate a turning light may be arranged in particular below the headlight devices 5, 6 designed to generate the low beam, as shown in the illustration of the front side 7 of the motor vehicle 1 in FIG. 3. Alternatively, it is also possible to arrange the headlight device 15 laterally next to the headlight device 5 and to arrange the headlight device 16 laterally next to the headlight device 6, wherein the headlight devices 5 and 15 or the headlight devices 6 and 16 may each be arranged in a common housing, in particular in a common motor vehicle headlight.

The change in brightness for illuminating the portions 24, 25 at an increased brightness and the dimming of the lamp 8 of the headlight device 16 may be reversed if the reverse travel is terminated, in particular if a first gear, a driving position (D) or a neutral position (N) of a transmission is adjusted, and/or if a speed of the motor vehicle 1 in the forward direction exceeds a speed threshold. It is also possible for the headlight devices 15, 16 designed to generate the turning light to be switched off when forward travel is initiated or when the speed limit value is exceeded, and for the area in front of the vehicle to be illuminated in particular only by the headlight devices 5, 6 designed to generate the low beam.

The invention claimed is:

1. A method for operating a motor vehicle, wherein the motor vehicle has a lighting device comprising two headlight devices, wherein the two headlight devices are arranged horizontally offset on a front side of the motor vehicle, and wherein each of the two headlight devices includes a lamp that is dimmable, the method comprising:
   illuminating, by each of the two headlight devices, a spatial region extending in front of the motor vehicle over a horizontal angular range according to a respective brightness generated by the lamps;
   before or during a reverse travel of the motor vehicle:
   adjusting the brightness of the lamp of at least one of the two headlight devices as a function of a steering angle of the motor vehicle; and
   at least one of:
      if the two headlight devices comprise multiple lamps:
         adjusting the multiple lamps such that a portion of the spatial region opposite a direction of the turning of the steering wheel is illuminated at an increased brightness, the multiple lamps each illuminating different portions of the spatial region; and
         illuminating, at a reduced brightness, another portion of the spatial region lying in the direction of the turning of the steering wheel; or
      dimming the brightness of at least one lamp of the two headlight devices arranged in the direction of the steering angle.

2. The method according to claim 1, wherein the two headlight devices comprise the multiple lamps, and wherein the two headlight devices are configured to generate a turning light and/or configured to generate a low beam.

3. The method according to claim 2, wherein at least one of the two headlight devices comprises at least two segments, each of the at least two segments comprising a respective lamp, the method further comprising:
   illuminating, by each segment, a portion of the spatial region.

4. The method according to claim 2, wherein the lamp of the at least one of the two headlight devices is configured to generate the low beam and the lamp or lamps of the other headlight device are configured to generate the turning light, the method further comprising:
   controlling the lamps such that respectively illuminated spatial regions adjoin or partially overlap one another, wherein at least a continuous brightness distribution is generated over a resulting overall horizontal angular range.

5. The method according to claim 1, further comprising:
   increasing the brightness, either continuously or in intervals, in the portion as the function the steering angle of the turning of the steering wheel.

6. The method according to claim 1, further comprising:
   changing, either continuously or in intervals, a position of a portion relative to the horizontal angular range of the spatial region as the function of the steering angle of the turning of the steering wheel.

7. The method according to claim 1, further comprising:
   dimming the brightness of the at least one lamp of the two headlight devices arranged in the direction of the turning of the steering wheel and designed to generate a turning light.

8. The method according to claim 1, further comprising:
   dimming, continuously or in intervals, the brightness of the lamp of the at least one of the two headlight devices in the direction of the turning of the steering wheel as the function of the steering angle of the turning of the steering wheel.

9. The method according to claim 1, further comprising:
   adjusting the brightness of the lamp as a function of an ambient brightness; and/or
   dimming the brightness of the lamp as a function of the ambient brightness.

10. The method according to claim 1, further comprising:
   adjusting the brightness of the lamp only when at least one limit value for the steering angle of the turning of the steering wheel is exceeded; and/or
   dimming the brightness of the lamp only when the at least one limit value for the steering angle of the turning of the steering wheel is exceeded.

11. The method according to claim 10, when the turning of the steering wheel is below the at least one limit value, the method further comprising:
   operating the lamp at a maximum brightness, in a dimmed status, or switched off, the lamp being configured to generate a turning light.

12. The method according to claim 10, wherein the at least one limit value for the steering angle is the same or different for a turning of the steering wheel to the left and for a turning of the steering wheel to the right.

13. The method according to claim 1, further comprising:
   if the reverse travel is terminated and/or if a speed of the motor vehicle in a forward direction exceeds a speed threshold, reversing a change in brightness and/or the dimming and/or switching off at least one of the two headlight devices.

14. A motor vehicle comprising:
   a lighting device including two headlight devices; and
   a control unit for controlling the lighting device, wherein the two headlight devices are arranged horizontally offset on a front side of the motor vehicle, and wherein each of the two headlight devices includes a lamp that is dimmable, the control unit being configured to:
      illuminate, by each of the two headlight devices, a spatial region extending in front of the motor vehicle over a horizontal angular range according to a respective brightness generated by the lamps;
   before or during a reverse travel of the motor vehicle:
      adjust the brightness of the lamp of at least one of the two headlight devices as a function of a steering angle of the motor vehicle; and
   at least one of:
   if the two headlight devices comprise multiple lamps:
      adjust the multiple lamps such that a portion of the spatial region opposite a direction of the turning of the steering wheel is illuminated at an increased brightness, the multiple lamps each illuminating different portions of the spatial region; and
      illuminate, at a reduced brightness, another portion of the spatial region lying in the direction of the turning of the steering wheel; or
   dim the brightness of at least one lamp of the two headlight devices arranged in the direction of the steering angle.

* * * * *